United States Patent
Watkins et al.

(10) Patent No.: US 6,507,672 B1
(45) Date of Patent: Jan. 14, 2003

(54) VIDEO ENCODER FOR DIGITAL VIDEO DISPLAYS

(75) Inventors: Daniel Watkins, Saratoga, CA (US); Gregg Dierke, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 08/940,784

(22) Filed: Sep. 30, 1997

Related U.S. Application Data

(63) Continuation-in-part of application No. 08/926,560, filed on Sep. 10, 1997, now Pat. No. 6,009,470.

(51) Int. Cl.[7] .................... G06K 9/36; H04B 1/66; H04N 11/02; H04N 7/26
(52) U.S. Cl. ............ 382/232; 382/233; 382/236; 382/238; 375/240.01; 375/240.12; 375/240.13; 375/240.25; 375/240.27; 386/33; 386/109; 386/111; 386/112; 386/124
(58) Field of Search .................... 382/232–233, 382/236, 238, 107, 209, 239; 375/240.01, 240.12, 240.13, 240.25, 240.27, 240.16, 240.17, 240.26, 240.02; 348/207, 231, 232, 409, 416; 386/33, 109, 111, 112, 116, 124

(56) References Cited

U.S. PATENT DOCUMENTS

| | | | | |
|---|---|---|---|---|
| 4,441,205 A | * | 4/1984 | Berkin et al. | 382/8 |
| 5,182,771 A | * | 1/1993 | Munich et al. | 380/5 |
| 5,537,440 A | * | 7/1996 | Eyuboglu et al. | 375/245 |
| 5,819,004 A | * | 10/1998 | Azadegan et al. | 386/112 |
| 6,154,603 A | * | 11/2000 | Willis et al. | 386/125 |
| 6,198,772 B1 | * | 3/2002 | Boice et al. | 375/240.17 |

* cited by examiner

Primary Examiner—Leo Boudreau
Assistant Examiner—Amir Alavi
(74) Attorney, Agent, or Firm—Conley, Rose & Tayon

(57) ABSTRACT

An improved multimedia encoder having features advantageous for use in a computer system. These features provide for the reduction of bandwidth and storage requirements, the enhancement of noise immunity, the evening of computational loading, and the use of multimedia drives for general purpose data storage. In one embodiment, the encoder receives image data representing a sequence of video frames and display text data representing a sequence of text fields to be overlaid on the sequence of video frames. The multimedia encoder produces a compressed video frame only for each subsequent video frame which is different from the current video frame. After each video frame is compressed, it becomes the current frame. The multimedia encoder provides error correction encoding to enhance noise immunity, and performs interframe compression using a dynamic search area to even out computational loading. Additionally, the multimedia encoder allows text file storage using a sub-picture unit bitstream and direct binary file storage, thereby enabling a write-able multimedia disk to displace a hard disk drive. A companion multimedia decoder recognizes these features and decodes a multimedia bitstream accordingly.

8 Claims, 6 Drawing Sheets

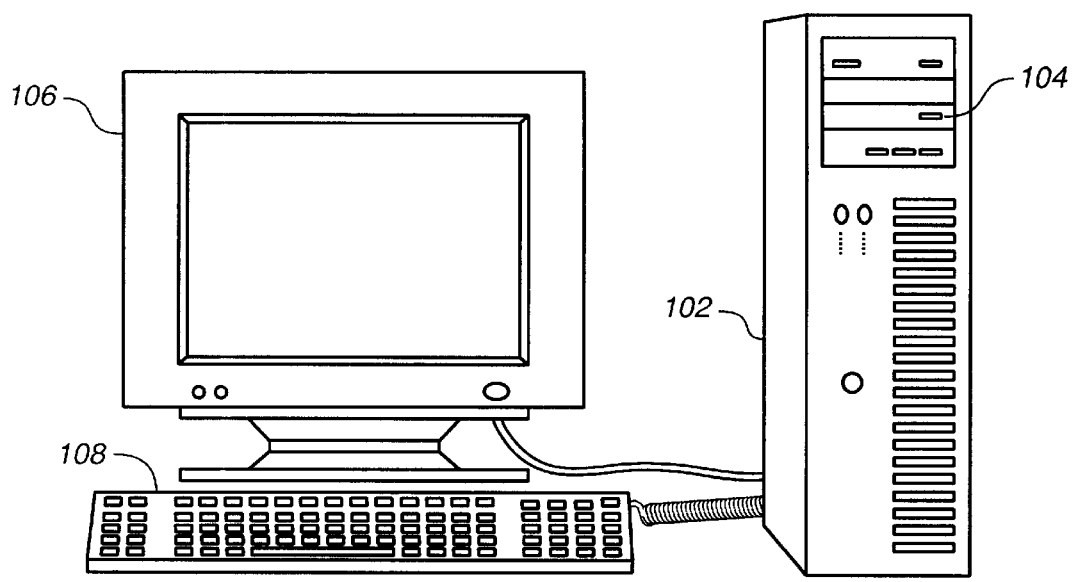
FIG._1
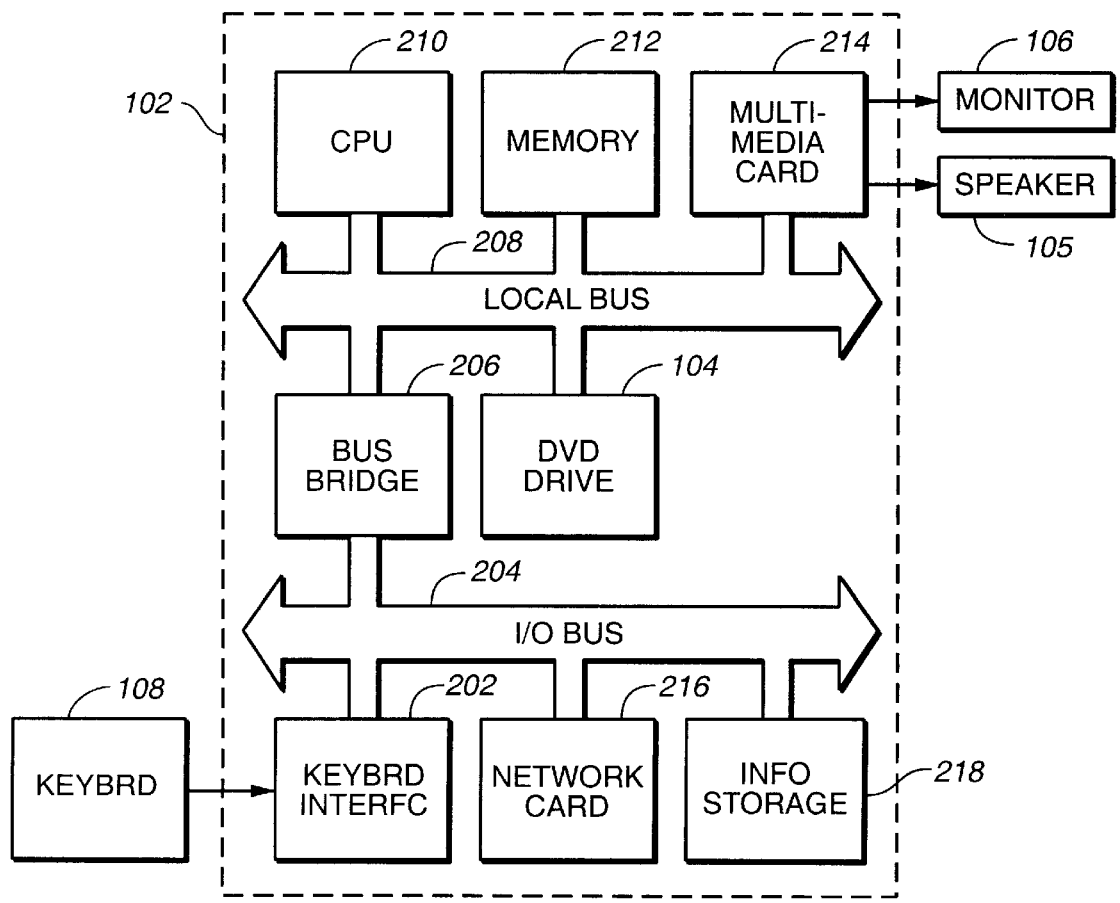
FIG._2

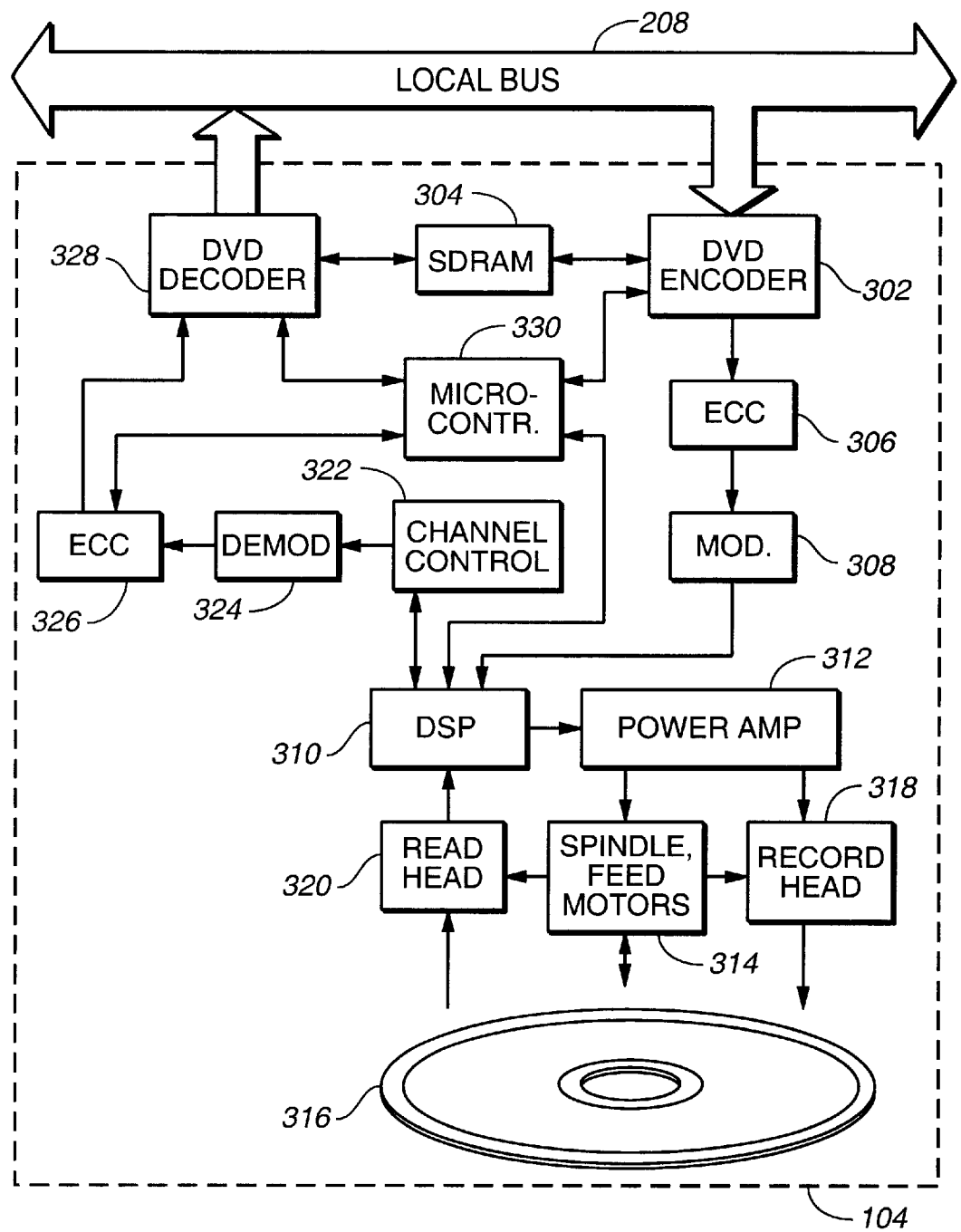
FIG._3

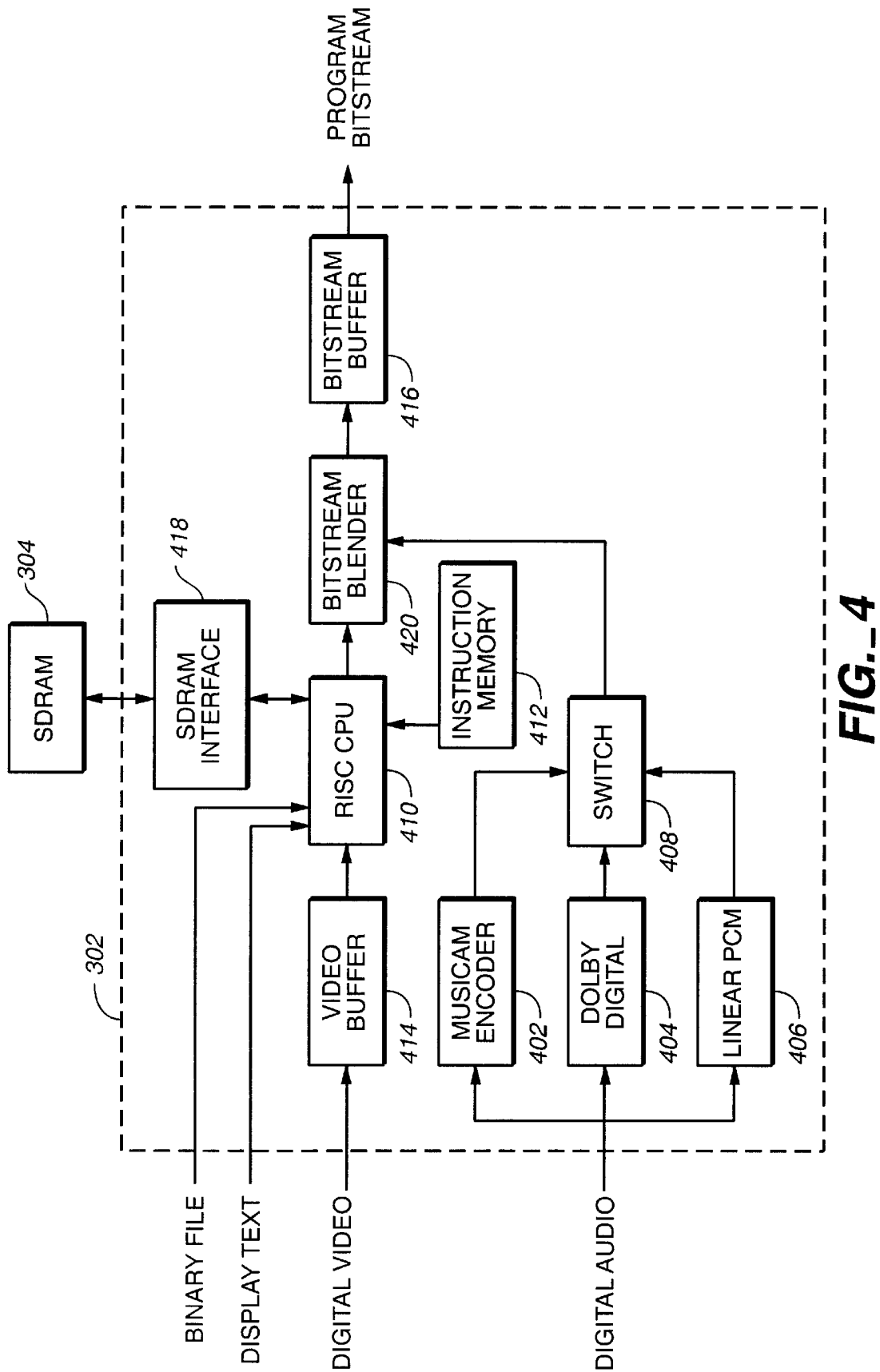
FIG._4

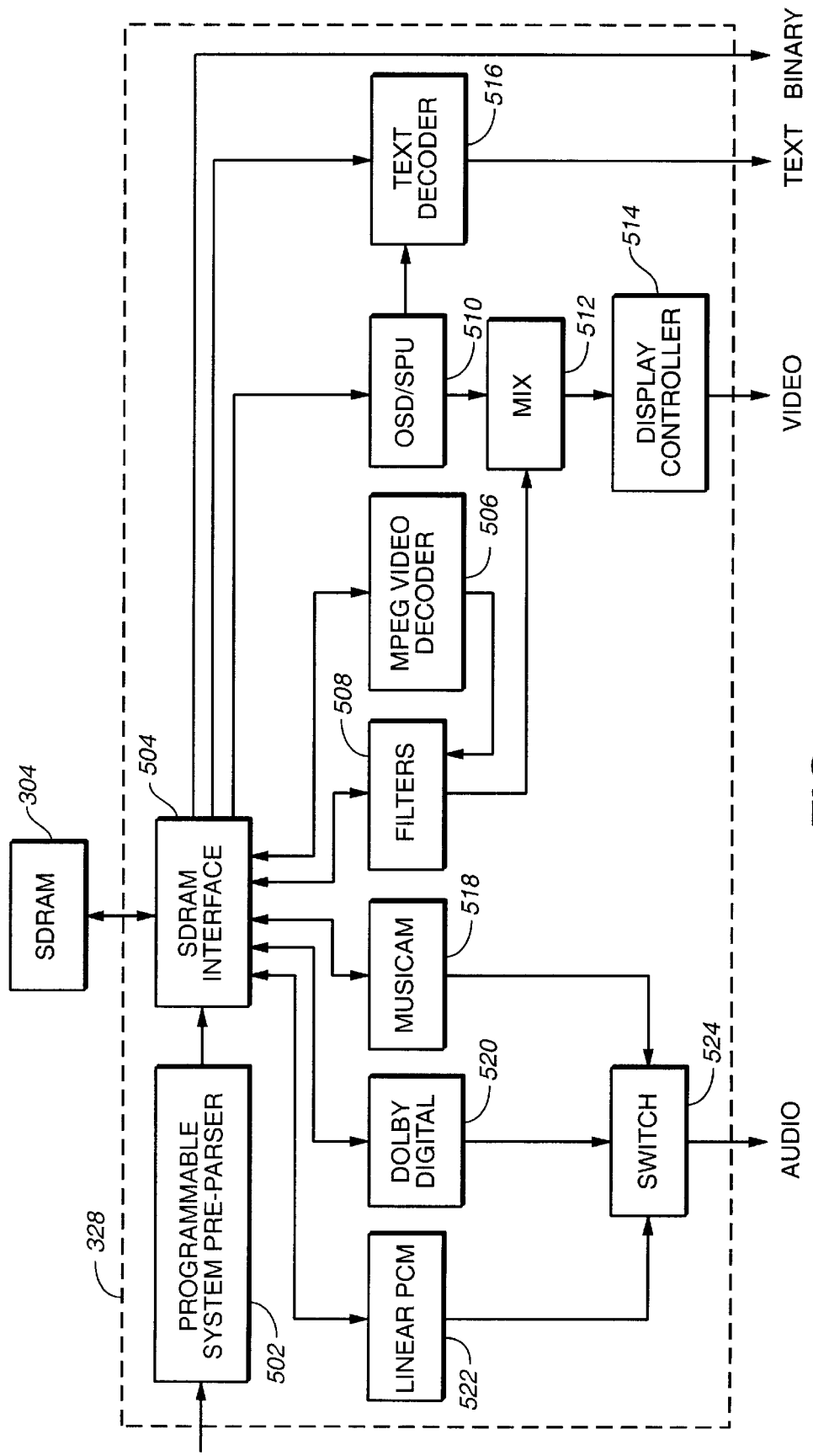
FIG._5

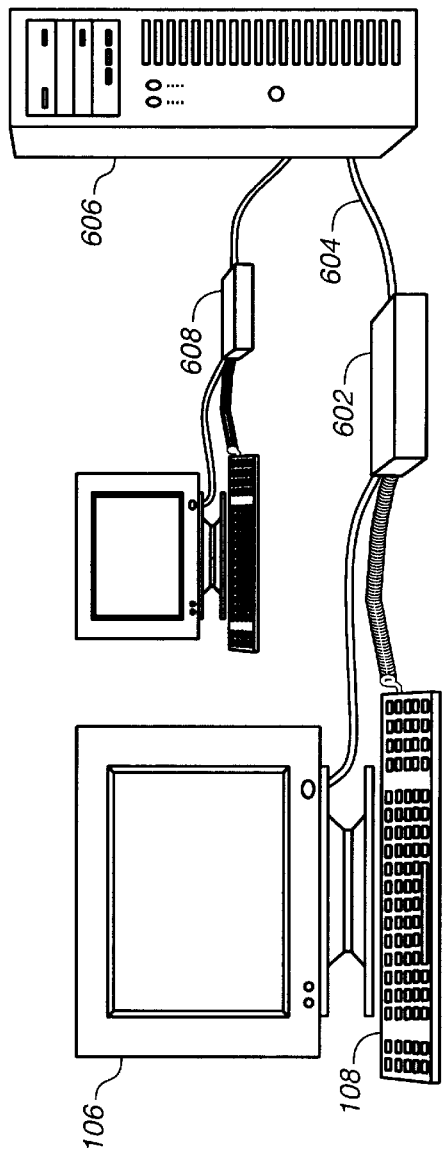
FIG._6
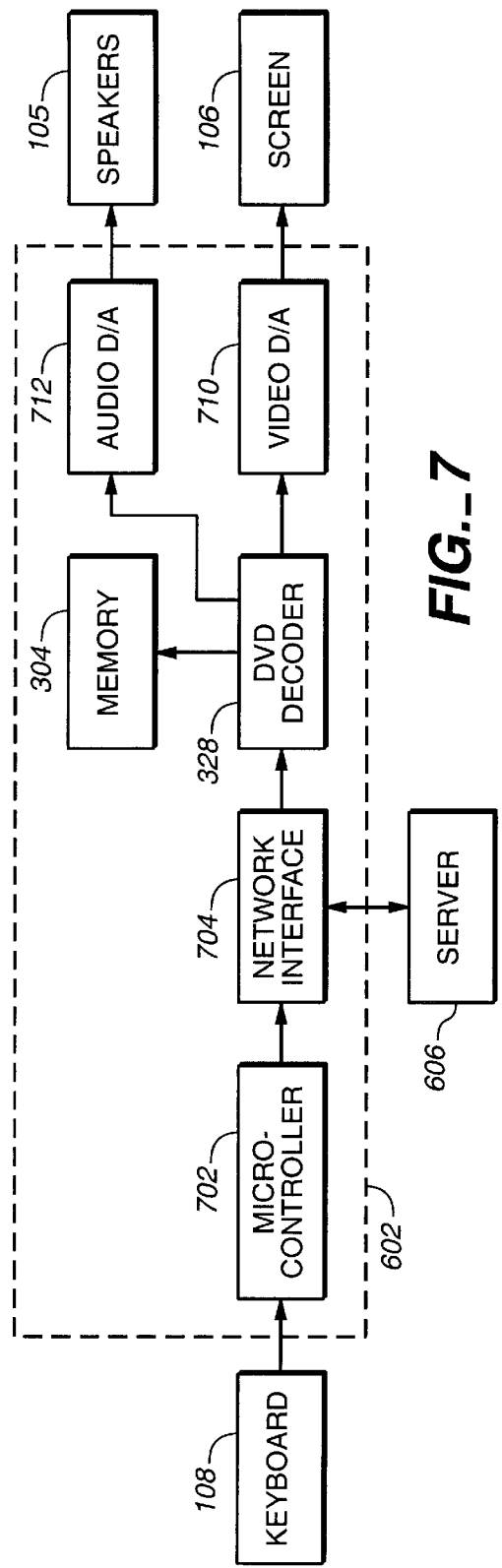
FIG._7

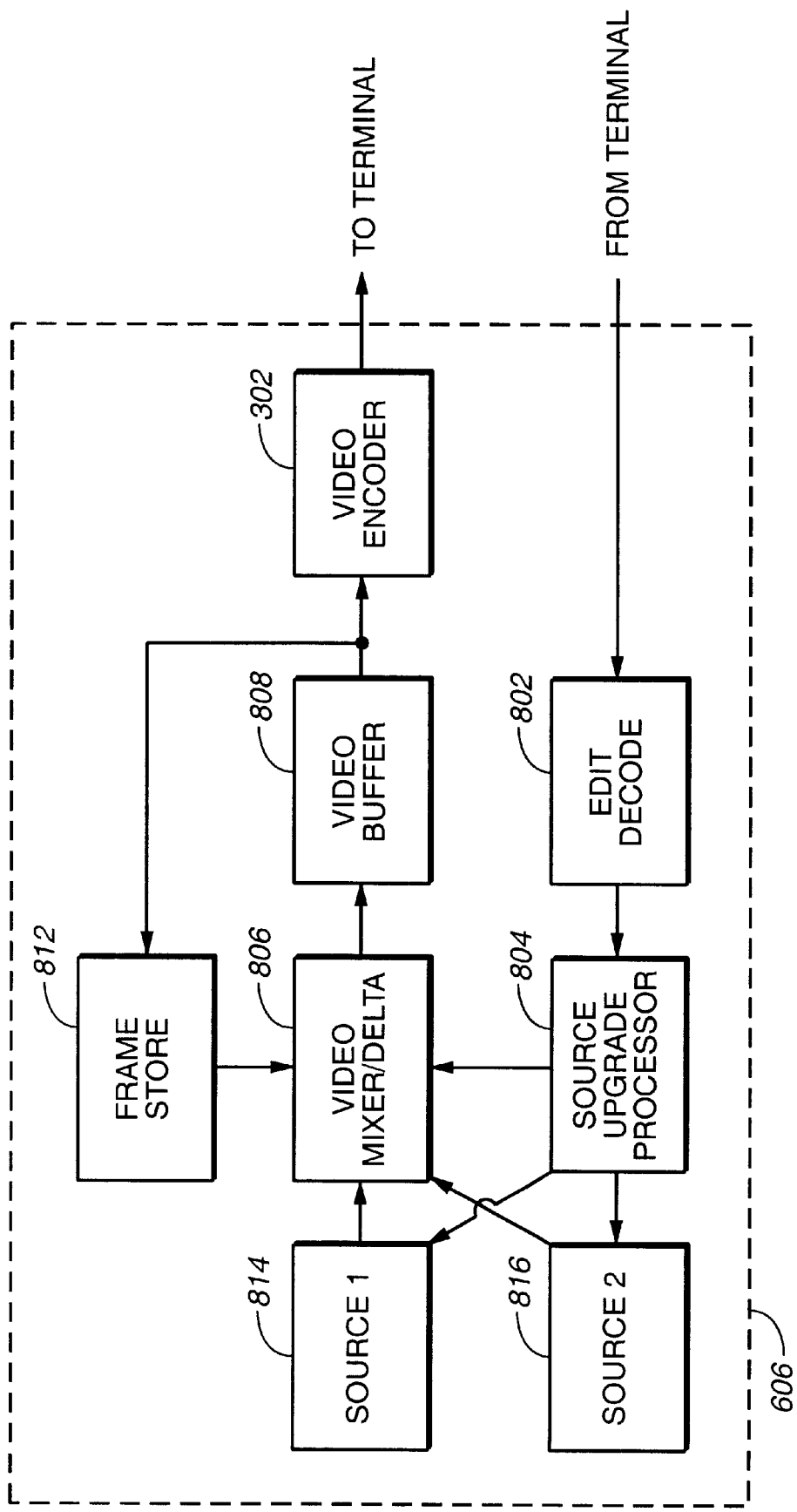
FIG._8

VIDEO ENCODER FOR DIGITAL VIDEO DISPLAYS

This application is a continuation-in-part of U.S. patent application Ser. No. 08/926,560 (now U.S. Pat. No. 6,009,470) filed Sep. 10, 1997 with inventorship Dan Watkins.

BACKGROUND OF THE INVENTION

1. Field of the Invention

This invention relates to the field of multimedia compression and data storage, and in particular to a multimedia encoder/decoder for compressing computer video displays and storing text files.

2. Description of the Related Art

Full-motion digital video requires a large amount of storage and data transfer bandwidth. Thus, video systems use various types of video compression algorithms to reduce the amount of necessary storage and transfer bandwidth. In general, different video compression methods exist for still graphic images and for full-motion video. Intraframe compression methods are used to compress data within a still image or single frame using spatial redundancies within the frame. Interframe compression methods are used to compress multiple frames, i.e., motion video, using the temporal redundancy between the frames. Interframe compression methods are used exclusively for motion video, either alone or in conjunction with intraframe compression methods.

Intraframe or still image compression techniques generally use frequency domain techniques, such as the discrete cosine transform (DCT). Intraframe compression typically uses the frequency characteristics of a picture frame to efficiently encode a frame and remove spatial redundancy. Examples of video data compression for still graphic images are JPEG (Joint Photographic Experts Group) compression and RLE (run-length encoding). JPEG compression is a group of related standards that use the discrete cosine transform (DCT) to provide either lossless (no image quality degradation) or lossy (imperceptible to severe degradation) compression. Although JPEG compression was originally designed for the compression of still images rather than video, JPEG compression is used in some motion video applications. The RLE compression method operates by testing for duplicated pixels in a single line of the bit map and storing the number of consecutive duplicate pixels rather than the data for the pixels themselves.

In contrast to compression algorithms for still images, most video compression algorithms are designed to compress full motion video. As mentioned above, video compression algorithms for motion video use a concept referred to as interframe compression to remove temporal redundancies between frames. Interframe compression involves storing only the differences between successive frames in the data file. Interframe compression stores the entire image of a key frame or reference frame, generally in a moderately compressed format. Successive frames are compared with the key frame, and only the differences between the key frame and the successive frames are stored. Periodically, such as when new scenes are displayed, new key frames are stored, and subsequent comparisons begin from this new reference point. It is noted that the interframe compression ratio may be kept constant while varying the video quality. Alternatively, interframe compression ratios may be content-dependent, i.e. if the video clip being compressed includes many abrupt scene transitions from one image to another, the compression is less efficient. Examples of video compression which use an interframe compression technique are MPEG, DVI and Indeo, among others.

MPEG Background

A compression standard referred to as MPEG (Moving Pictures Experts Group) compression is a set of methods for compression and decompression of full motion video images which uses the interframe and intraframe compression techniques described above. MPEG compression uses both motion compensation and discrete cosine transform (DCT) processes, among others, and can yield very high compression ratios.

The two predominant MPEG standards are referred to as MPEG-1 and MPEG-2. The MPEG-1 standard generally concerns inter-field data reduction using block-based motion compensation prediction (MCP), which generally uses temporal differential pulse code modulation (DPCM). The MPEG-2 standard is similar to the MPEG-1 standard, but includes extensions to cover a wider range of applications, including interlaced digital video such as high definition television (HDTV).

Interframe compression methods such as MPEG are based on the fact that, in most video sequences, the background remains relatively stable while action takes place in the foreground. The background may move, but large portions of successive frames in a video sequence are redundant. MPEG compression uses this inherent redundancy to encode or compress frames in the sequence.

An MPEG stream includes three types of pictures, referred to as the Intra (I) frame, the Predicted (P) frame, and the Bi-directional Interpolated (B) frame. The I (intra) frames contain the video data for the entire frame of video and are typically placed every 10 to 15 frames. Intraframes provide entry points into the file for random access, and are generally only moderately compressed. Predicted frames are encoded with reference to a past frame, i.e., a prior Intraframe or Predicted frame. Thus P frames only include changes relative to prior I or P frames. In general, P frames receive a fairly high amount of compression and are used as references for future P frames. Thus, both I and P frames are used as references for subsequent frames. Bi-directional pictures include the greatest amount of compression and require both a past and a future reference in order to be encoded. Bi-directional frames are never used as references for other frames.

In general, for the frame(s) following a reference frame, i.e., P and B frames that follow a reference I or P frame, only small portions of these frames are different from the corresponding portions of the respective reference frame. Thus, for these frames, only the differences are captured, compressed and stored. The differences between these frames are typically generated using motion vector estimation logic, as discussed below.

When an MPEG encoder receives a video file or bitstream, the MPEG encoder generally first creates the I frames. The MPEG encoder may compress the I frame using an intraframe lossless compression technique. After the I frames have been created, the MPEG encoder divides respective frames into a grid of 16×16 pixel squares called macroblocks. The respective frames are divided into macroblocks in order to perform motion estimation/compensation. Thus, for a respective target picture or frame, i.e., a frame being encoded, the encoder searches for a best fit or best match between the target picture macroblock and a block in a neighboring picture, referred to as a search frame. For a target P frame, the encoder searches in a prior I or P frame. For a target B frame, the encoder searches in a prior and subsequent I or P frame. When a best match is found, the encoder transmits a vector movement code or motion vector. The vector movement code or motion vector includes a pointer to the best fit search frame block as well as information on the difference between the best fit block and the respective target block. The blocks in target pictures that have no change relative to the block in the reference or search frame are ignored. Thus the amount of data that is actually stored for these frames is significantly reduced.

After motion vectors have been generated, the encoder then encodes the changes using spatial redundancy. Thus, after finding the changes in location of the macroblocks, the MPEG algorithm further calculates and encodes the difference between corresponding macroblocks. Encoding the difference is accomplished through a math process referred to as the discrete cosine transform or DCT. This process divides the macroblock into four sub-blocks, seeking out changes in color and brightness. Human perception is more sensitive to brightness changes than color changes. Thus the MPEG algorithm devotes ore effort to reducing color space rather than brightness.

Therefore, MPEG compression is based on two types of redundancies in video sequences, these being spatial, which is the redundancy in an individual frame, and temporal, which is the redundancy between consecutive frames. Spatial compression is achieved by considering the frequency characteristics of a picture frame. Each frame is divided into non-overlapping blocks and respective sub-blocks, and each block is transformed via the discrete cosine transform (DCT).

After the transformed blocks are converted to the "DCT domain", each entry in the transformed block is quantized with respect to a set of quantization tables. The quantization step for each entry can vary, taking into account the sensitivity of the human visual system (HVS) to the frequency. Since the HVS is more sensitive to low frequencies, most of the high frequency entries are quantized to zero. In this step where the entries are quantized, information is lost and errors are introduced to the reconstructed image. Zero run length encoding is used to transmit the quantized values. The statistical encoding of the expected runs of consecutive zeroed-valued coefficients corresponding to the higher-order coefficients accounts for considerable compression gain.

In order to cluster non-zero coefficients early in the series and to encode as many zero coefficients as possible following the last non-zero coefficient in the ordering, the coefficient sequence is often organized in a specified orientation termed zigzag ordering. Zigzag ordering concentrates the highest spatial frequencies at the end of the series. Once the zigzag ordering has been performed, the encoder performs "run-length coding" on the AC coefficients. This process reduces each 8 by 8 block of DCT coefficients to a number of events represented by a non-zero coefficient and the number of preceding zero coefficients. Because the high-frequency coefficients are more likely to be zero, run-length coding results in additional video compression.

The video encoder then performs variable-length coding (VLC) on the resulting data. VLC is a reversible procedure for coding data that assigns shorter code words to frequent events and longer code words to less frequent events, thereby achieving additional video compression. Huffman encoding is a particularly well-known form of VLC that reduces the number of bits necessary to represent a data set without losing any information.

The final compressed video data is then ready to be transmitted to a storage device or over a transmission medium for reception and decompression by a remotely located decoder. Because of the picture dependencies, i.e., the temporal compression, the order in which the frames are transmitted, stored, or retrieved, is not necessarily the display order, but rather an order required by the decoder to properly decode the pictures in the bitstream. For example, a typical sequence of frames, in display order, might be shown as follows:

| I | B | B | P | B | B | P | B | B | P | B | B | I | B | B | P | B | B | P |
|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 |

By contrast, the bitstream order corresponding to the given display order would be as follows:

| I | P | B | B | P | B | B | P | B | B | I | B | B | P | B | B | P | B | B |
|---|---|---|---|---|---|---|---|---|---|---|---|---|---|---|---|---|---|---|
| 0 | 3 | 1 | 2 | 6 | 4 | 5 | 9 | 7 | 8 | 12 | 10 | 11 | 15 | 13 | 14 | 18 | 16 | 17 |

Because the B frame depends on a subsequent I or P frame in display order, the I or P frame must be transmitted and decoded before the dependent B frame.

As discussed above, temporal compression makes use of the fact that most of the objects remain the same between consecutive picture frames, and the difference between objects or blocks in successive frames is their position in the frame as a result of motion (either due to object motion, camera motion or both). The key to this relative encoding is motion estimation. In general, motion estimation is an essential processing requirement in most video compression algorithms. In general, motion estimation is the task of identifying temporal redundancy between frames of the video sequence.

The video decoding process is generally the inverse of the video encoding process and is employed to reconstruct a motion picture sequence from a compressed and encoded bitstream. The data in the bitstream is decoded according to a syntax that is defined by the data compression algorithm. The decoder must first identify the beginning of a coded picture, identify the type of picture, then decode each individual macroblock within a particular picture.

When encoded video data is transferred to a video decoder, the encoded video data is received and stored in a rate or channel buffer. The data is then retrieved from the channel buffer by a decoder or reconstruction device for performing the decoding process. When the MPEG decoder receives the encoded stream, the MPEG decoder reverses the above operations. Thus the MPEG decoder performs inverse scanning to remove the zigzag ordering, inverse quantization to de-quantize the data, and the inverse DCT to convert the data from the frequency domain back to the pixel domain. The MPEG decoder also performs motion compensation using the transmitted motion vectors to re-create the temporally compressed frames.

When frames are received which are used as references for other frames, such as I or P frames, these frames are decoded and stored in memory. When a reconstructed frame is a reference or anchor frame, such as an I or a P frame, the reconstructed frame replaces the oldest stored anchor frame and is used as the new anchor for subsequent frames.

When a temporally compressed or encoded frame is received, such as a P or B frame, motion compensation is performed on the frame using the neighboring decoded I or P reference frames, also called anchor frames. The temporally compressed or encoded frame, referred to as a target frame, will include motion vectors which reference blocks in neighboring decoded I or P frames stored in the memory. The MPEG decoder examines the motion vector, determines the respective reference block in the reference frame, and accesses the reference block pointed to by the motion vector from the memory.

In order to reconstruct a B frame, the two related anchor frames or reference frames must be decoded and available in a memory, referred to as the picture buffer. This is necessary since the B frame was encoded relative to these two anchor frames. Thus the B frame must be interpolated or reconstructed using both anchor frames during the reconstruction process.

After all of the macroblocks have been processed by the decoder, the picture reconstruction is complete. The resultant coefficient data is then inverse quantized and operated on by an IDCT process to transform the macroblock data from the frequency domain to data in the time and space domain. As noted above, the frames may also need to be re-ordered before they are displayed in accordance with their display order instead of their coding order. After the frames are re-ordered, they may then be displayed on an appropriate display device.

As described above, as the encoded video data is decoded, the decoded data is stored into a picture store buffer. In some configurations, the channel and picture buffers are incorporated into a single integrated memory buffer. The decoded data is in the form of decompressed or decoded I, P or B frames. A display processor retrieves the picture data for display by an appropriate display device, such as a TV monitor or the like.

DVD Background

DVD is a multimedia compression standard which incorporates MPEG for video compression, various audio compression techniques, and pixel run length compression for text displays. Each of the compressed audio, video, and text bitstreams may be available in more than one form (e.g. different languages, camera angles, option menus), and the multiple bitstreams are combined into one multimedia bitstream by packetizing the individual bitstreams and interleaving the bitstream packets. DVD has found wide applicability which includes digital television transmission and video games.

Since compressed multimedia is finding greater application in computer systems, it would be desirable to have an improved multimedia encoder (and decoder) which provides features advantageous to the compression of digital video displays.

SUMMARY OF THE INVENTION

The problems outlined above are in large part solved by an improved multimedia encoder having features advantageous for use in a computer system. These features provide for the reduction of bandwidth and storage requirements, the enhancement of noise immunity, the evening of computational loading, and the use of multimedia drives for general purpose data storage. In one embodiment, the encoder receives image data representing a sequence of video frames and display text data representing a sequence of text fields to be overlaid on the sequence of video frames. The multimedia encoder produces a compressed video frame only for each subsequent video frame which is different from the current video frame. After each video frame is compressed, it becomes the current frame. The multimedia encoder provides error correction encoding to enhance noise immunity, and performs interframe compression using a dynamic search area to even out computational loading. Additionally, the multimedia encoder allows text file storage using a sub-picture unit bitstream and direct binary file storage, thereby enabling a writeable multimedia disk to displace a hard disk drive. A companion multimedia decoder recognizes these features and decodes a multimedia bitstream accordingly.

Broadly speaking, the present invention contemplates an improved multimedia encoder for compressing computer video displays, wherein the encoder comprises a video buffer, a microprocessor, and a bitstream buffer. The video buffer receives image data. The microprocessor, which may include special purpose video encoding hardware, is coupled to the video buffer to retrieve image data and is configured to store a previous video frame in a frame store. The microprocessor generates a compressed multimedia bitstream which includes a compressed video bitstream representative of the received image data. The bitstream buffer is coupled to the microprocessor to receive the compressed multimedia bitstream. The previous video frame is one of a sequence of video frames which includes a subsequent video frame. A compressed representation of the subsequent video frame is provided to the bitstream buffer as part of the multimedia bitstream only if the subsequent video frame is different from the previous video frame. The microprocessor may also receive text data and be configured to store a previous text field in a text field store. When the text data represents a change to the previous text field, the microprocessor provides a compressed representation of a subsequent text field to the bitstream buffer as part of the multimedia bitstream.

BRIEF DESCRIPTION OF THE DRAWINGS

Other objects and advantages of the invention will become apparent upon reading the following detailed description and upon reference to the accompanying drawings in which:

FIG. 1 shows a general purpose computer having an encoded multimedia drive;

FIG. 2 is a functional block diagram of a general purpose computer having an encoded multimedia drive;

FIG. 3 is a functional block diagram of an encoded multimedia drive;

FIG. 4 is a functional block diagram of a multimedia encoder;

FIG. 5 is a functional block diagram of a multimedia decoder;

FIG. 6 shows an encoded multimedia network;

FIG. 7 is a functional block diagram of an encoded multimedia terminal; and

FIG. 8 is a functional block diagram of an encoded multimedia server port.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the figures, FIG. 1 shows a general purpose computer system 102 having an encoded multimedia drive 104, a display monitor 106, and a user input device 108. The general purpose computer system 102 benefits from features of a multimedia encoder in drive 104 which permit the use of a multimedia disk as a general purpose storage device. The system 102 accepts write-able multimedia disks in drive 104, and in response to input from input device 102 can store information to the multimedia disk and read information from the multimedia disk. When the information represents a video display, the system 102 can show the video display on display monitor 106.

Examples of user-input devices 108 which may be used with computer system 102 include: a handset, a joystick, a keyboard, a light pen, a microphone, a mouse, a remote control, a touch-screen, a trackball, and a video camera. Some of these, particularly the microphone (for voice recognition) and the video camera (for motion recognition) may require additional processor hardware in the computer system 102 to convert the sound and video to acceptable user inputs.

Examples of display monitors 106 include: televisions, computer monitors, LCD/LED flat panel displays, and projection systems. The system 102 may also include audio capability, so that audio programs stored on the multimedia disk are playable. The system 102 would then include audio devices such as speakers, headphones, and/or audio recorders for reproducing the audio program.

Turning now to FIG. 2, a functional block diagram of personal computer 102 is shown. Input from user input device 108 is captured by a user-input device interface 202 and stored until CPU 210 retrieves the user input via CPU bus 208, bus bridge 206, and I/O bus 204, and stores it in memory 212 via CPU bus 208. A software application in memory 212 being executed by CPU 210 responds to the user input. The response can take the form of communicating with a network via CPU bus 208, bus bridge 206, I/O bus 204 and network card 216, or take the form of reading or writing to a hard disk 218 via CPU bus 208, bus bridge 206 and I/O bus 204. The response may involve an update to a video display on monitor 106 via CPU bus 208 and multimedia card 214.

In one embodiment, multimedia drive 104 is configured to accept a variety of optically readable disks. For example, audio compact disks, CD-ROMs, DVD disks, and DVD-RAM disks may be accepted. The drive 104 can consequently read audio programs, binary files, and multimedia bitstreams. The drive 104 is also configured to write multimedia bitstreams, and may additionally be configured to write binary files. The drive 104 includes a multimedia decoder which converts read multimedia bitstreams into video displays, audio programs, and text fields. The drive 104 also includes a multimedia encoder for converting video displays, audio programs, and text fields into a multimedia bitstream. The CPU 210 can instruct the drive 104 to forward the video displays (with text fields) and audio programs directly to the multimedia card 214 for display on monitor 106 and playback on audio device 105.

Turning now to FIG. 3, a functional block diagram of a multimedia drive is shown. The system 102 provides digital audio and video signals to the multimedia encoder 302 via CPU bus 208. The system may further provide display text and binary files to the multimedia encoder 302. Multimedia encoder 302 uses synchronous dynamic random access memory (SDRAM) 304 as a frame store buffer while encoding the received signals. The resulting multimedia bitstream is processed by an error correction encoder 306 then converted to a modulated digital signal by modulator 308. The modulated digital signal is coupled to a digital signal processor (DSP) 310 and from there to a power amplifier 312. Amplified signals are coupled to drive motors 314 to spin a recordable multimedia disk 316, and to a record head 318 to store the modulated digital signal on the recordable multimedia disk 316.

Stored data can be read from the recordable multimedia disk 316 by read head 320 which sends a read signal to DSP 310 for filtering. The filtered signal is coupled to channel control buffer 322 for rate control, then demodulated by demodulator 324. An error correction code decoder 326 converts the demodulated signal into a multimedia bitstream which is then decoded by multimedia decoder 328. The decoded bitstream is sent via CPU bus 208 to its destination. A microcontroller 330 coordinates the operations of the system components.

Multimedia encoder 302 operates to encode digital audio signals, digital video signals, and display text. The multimedia encoder 302 may also forward binary files without first encoding them. The operation and structure of the multimedia encoder 302 is discussed further below.

Error correction encoder 306 and modulator 308 operate to provide channel coding and modulation for the output of the multimedia encoder 302. Error correction encoder 306 may be a Reed-Solomon block code encoder, which provides protection against errors in the read signal. The modulator 308 converts the error correction coded output into a modulated signal suitable for recording on multimedia disk 316.

DSP 310 serves multiple functions. It provides filtering operations for write and read signals, and it acts as a controller for the read/write components of the system. The modulated signal provided by modulator 308 provides an "ideal" which the read signal should approximate. In order to most closely approximate this ideal, certain nonlinear characteristics of the recording process must often be compensated. The DSP 310 may accomplish this compensation by pre-processing the modulated signal and/or post-processing the read signal. The DSP 310 controls the drive motors 314 and the record head 318 via the power amplifier 312 to record the modulated signal on the multimedia disk 316. The DSP 310 also controls the drive motors 314 and uses the read head 320 to scan the multimedia disk 316 and produce a read signal.

The channel control buffer 322 provides buffering of the read signal, while demodulator 324 demodulates the read signal and error correction code decoder 326 decodes the demodulated signal. After decoding the demodulated signal, the error correction decoder 326 forwards the decoded signal to multimedia decoder 328.

Multimedia decoder 328 operates to decode the output of the error correction decoder 326 to produce digital audio signals, digital video signals, and text fields. The error correction decoder output may also be an un-encoded binary file which is parsed but not decoded by multimedia decoder 328. The operation and structure of multimedia decoder 328 are discussed further below. The digital audio signal may be sent via CPU bus 208 and multimedia card 214 to audio device 105, and the digital video signal (with text fields) may be similarly sent to monitor 106.

Turning now to FIG. 4, a block diagram of a multimedia video encoder 302 is shown. The digital audio signal may be compressed by one of three audio compression blocks: a MUSICAM encoder 402, a Dolby digital (AC3) encoder 404, or a Linear PCM encoder 406. A multiplexing switch 408 is set by a special purpose RISC CPU 410 to choose the audio compression method. The RISC CPU 410 operates according to software stored in instruction memory 412. A video buffer 414 buffers the digital video signal while the RISC CPU 410 operates to convert the digital video signal into a compressed video signal to be combined with the compressed audio signal. The RISC CPU 410 also receives display text for text fields and forms a bitmap of the text field. The bitmap may be run length encoded. A bitstream blender 420 combines the bitmapped text with the compressed audio and digital signals to form a multimedia bitstream. A bitstream buffer 416 is used to buffer the multimedia bitstream until it can be processed by the error correction encoder 306. The video compression process requires the use of frame buffers, and RISC CPU 410 uses SDRAM 304 via SDRAM interface 418 for this purpose.

In one embodiment, special purpose RISC CPU 410 includes video encoding hardware which eases the computational loading of the CPU by performing at least a portion of the video compression method. In MPEG encoding, the hardware could perform motion estimation, provide a discrete cosine transform, determine a quantization matrix, and re-order and encode the transform coefficients to produce compressed macroblocks to the CPU. The CPU can then complete the encoding process.

Note that text files can be stored by the drive 104 on the disk 316. In one embodiment, the RISC CPU 410 processes the text file as a form of display text. Each character is converted to a bitmap and sent using the sub-picture unit bitstream. Each character of the file may be encoded as a text field, compressed, and sent as part of the multimedia bitstream. Run length coding is one text compression technique that is lossless and can be used. A full screen of text can be compressed 20:1 in some cases using run length codes. This process is easily inverted by a multimedia decoder as discussed further below.

In a second embodiment, the RISC CPU 410 operates in a file storage mode. In this mode, the RISC CPU 410 is not compressing audio, video and display text. Instead it processes a binary file for storage on disk 316. The processed file goes through the same error correction, modulation, filtering, and recording steps as the multimedia bitstream.

The general nature of the video compression performed by the RISC CPU 410 is MPEG encoding, and may include sub-sampling of the luminance and chrominance signals, conversion to a different resolution, determination of frame compression types, frame compression, and re-ordering of the frame sequence. The frame compression may be intraframe compression or interframe compression. The intraframe compression is performed using a block discrete cosine transform with zig-zag reordering of transform coefficients followed by run length and Huffman encoding of the transform coefficients. The interframe compression is performed by additionally using motion estimation, predictive coding, and coefficient quantization.

To save bandwidth, the RISC CPU 410 can be configured to not compress and send the current video frame if there is no change from the previous video frame. Since computer displays tend to be static, changing only in response to user edits, the encoder 302 may achieve a significant bandwidth savings by not encoding video frames if they are identical to a previous video frame. In one embodiment, the RISC CPU 410 generates a content signature which is representative of the frame content. The content signatures of the current video frame and the previous video frame may be compared, and if they are identical or within some predetermined tolerance of each other, then the RISC CPU 410 withholds the compressed current video frame from the multimedia bitstream.

A time signature or a frame number may be attached to each frame. The decoder 328 repeatedly displays a current video frame until a subsequent video frame is "available" for display. For stored video, a subsequent frame is "available" when the time index or frame index equals or exceeds the signature attached to the subsequent frame. For real-time video, a subsequent frame may be "available" as soon as it is received.

To even out computational load requirements, the encoder 302 can be configured to encode P and B frames using a dynamic search area. When generating predicted and bidirectional frames, encoder 302 performs a search of the anchor frames for image regions which are most like the macroblock to be encoded. Increasing the size of the search area tends to provide a better match, thereby decreasing the bandwidth needed to compress the video frame, but a penalty is incurred in the form of an increased computational load. Since video frames can have various complexities and vary at different rates, any given video frame may require more or less computations for compression than average. The unpredictability of the computational load can sometimes result in failure of the encoder. In one embodiment, encoder 302 uses a dynamic search area to even out the computational loading. During periods of high computational demand, the search area is reduced to reduce the computational load to avoid having the encoder fall too far behind. During times of low computational demand, the search area is increased to minimize the bandwidth requirements.

In one embodiment, the dynamic search area of encoder 302 may be implemented using a quality threshold based early search termination. While searching for a match to the current macroblock, the encoder 302 determines the quality of many candidates by comparing them to the current macroblock. Rather than do a complete search and choose the best match, the encoder accepts the first candidate that matches to within the quality threshold. This causes an early termination to the search, effectively reducing the search area. The average size of the search area can then be regulated by adjusting the quality threshold. By adjusting the threshold to require a better match, the average search area is increased. Conversely, the average search area can be reduced by adjusting the threshold to allow poorer matches to be used. To guarantee that a match is chosen, an upper limit on the search area may be enforced and the best match chosen, or the quality threshold may be adjusted as the search area expands so that eventually the best match so far will be acceptable.

Turning now to FIG. 5, a block diagram of multimedia decoder 328 is shown. Multimedia decoder 328 may receive either a decoded binary file bitstream or an encoded multimedia bitstream. The binary file bitstream may be stored by pre-parser 502 in memory 304 via memory interface 504. The binary file may then be transferred to CPU bus 208 from memory 304.

The multimedia bitstream is received by programmable system pre-parser 502 which parses the bitstream syntax, performs elementary operations to minimize the storage usage of the bitstream data, and routes the bitstream data to the appropriate buffer for further processing. Memory 304 may be used to buffer the routed data. In one embodiment, the memory 304 is a synchronous dynamic random access memory (SDRAM) which is accessed via a SDRAM interface 504. Data routed to the video decoder buffer is decoded by video decoder 506 and the decoded image data may be filtered by filters 508. Data routed to the sub-picture unit buffer is decoded by sub-picture unit 510 (SPU—also referred to as on-screen display unit or OSD). The decoded SPU signal may be masked onto the filtered image by mixer 512, and subsequently routed to display controller 514. The display controller 514 synchronizes the transfer of pixel data to multimedia card 214 for display on monitor 106. The decoded SPU signal may also be transferred from sub-picture unit 510 to text decoder 516 for conversion to text. In one embodiment, text decoder 516 operates to convert bitmaps of single characters into ASCII text. The characters are concatenated to form a text file which can be transferred to memory 212 via CPU bus 208.

Pre-parser 502 routes audio data to an audio buffer from which it is decoded by one of three audio decoders: MUSICAM decoder 518, Dolby Digital decoder 520, or Linear PCM decoder 522. The outputs of these decoders are routed to a multiplexing switch 524 which may be set to route the decoded digital audio signal to multimedia card 214 via CPU bus 208.

Multimedia encoder 302 and multimedia decoder 328 make it possible to store text files on a multimedia disk, either in the form of an SPU bitstream or in the form of a binary file. It then becomes possible for a multimedia drive to displace a hard disk drive in a general purpose computer system.

Turning now to FIG. 6, an encoded multimedia network is shown. The multimedia network benefits from the bandwidth reduction, noise immunity enhancement, and computational loading features of a multimedia encoder in server 606. An encoded multimedia terminal 602 accepts input from a user-input device 108 and sends the input to local server 606 via a local office interconnect 604. The server 606 is executing a software application for the user of encoded multimedia terminal 602. The software application processes the user input and generates a video display for screen 106. The server 606 compresses the video display into an encoded multimedia sequence and transmits the encoded multimedia sequence to encoded multimedia terminal 602 via a high bandwidth network channel 604. Encoded multimedia terminal 602 receives and decodes the encoded multimedia sequence to show the video display on screen 106. Additional encoded multimedia terminals 608 may also be coupled to the server 606, which executes associated software applications for each terminal in a time-sharing fashion. Encoded multimedia terminals 602, 608 can be built using few, low-cost components and hence can be a very economical way to provide users with access to a computer network that provides all the real-time responsiveness of full-powered personal computers.

It may be preferred that the high bandwidth channel 604 have a capacity for more than 10 Mb/s (mega-bits per second). Examples of such channels include: satellite transmission links, cable modems, Ethernet, Fibre channel, and IEEE 1394. A high bandwidth is not required for transmitting the user input to the server, hence a lower capacity channel such as a modem may be used. However, it is understood that the high bandwidth channel 604 may be designed to provide for a low bandwidth user signal transmission to the server.

Turning now to FIG. 7, a functional block diagram of encoded multimedia terminal 602 is shown. Input from user-input device 108 is converted to a user input by microcontroller 702 and sent to network interface 704. Network interface 704 communicates the user input to server 606. A software application executed by the server 606 processes the user input and responsively updates a video display. The server then compresses the video display into an encoded multimedia bitstream which is communicated back to the network interface 704. The network interface 704 provides the encoded multimedia bitstream to a multimedia bitstream decoder 328. Multimedia bitstream decoder 328 decodes the encoded multimedia bitstream to produce a sequence of video frames. Anchor video frames are stored in memory 304 and are used to decode predictive and bidirectional frames which are encoded relative to these anchor frames. The sequence of video frames is provided in the form of a digital video bitstream to video digital-to-analog converter 710. Video D/A 710 converts the digital video bitstream into a video signal suitable for showing the video display on video screen 106. Video D/A 710 is typically an NTSC/PAL rasterizer for television, but may also be a RAMDAC for other types of video screens.

The software application running on server 606 may also provide an audio program which the server compresses into the encoded multimedia bitstream. The multimedia bitstream decoder 328 also decodes the audio program and provides a digital audio signal to audio digital-to-analog converter 712. Audio D/A 712 converts the digital audio signal into an analog audio signal which reproduces the audio program via speakers 105.

The microcontroller 702 can be a simple UART (universal asynchronous receiver/transmitter) able to sense a keystroke or joystick motion and configured to transmit an "action" code that corresponds to the sensed action. Alternatively, the microcontroller 702 may subsume some of the network interface functionality, and be a simple processor which executes software device drivers for the interface and decoder hardware. A EEPROM memory may be coupled to the microcontroller to provide such software drivers.

Encoded multimedia terminal 602 may also include a video buffer for buffering video sequences. This would be particularly desirable for networks that use burst-communications. The encoded multimedia terminal 602 may further include recordable drives or other information storage devices for archiving a session. This might be desirable for authors of DVD disks.

Turning now to FIG. 8, a functional block diagram of an encoded multimedia server port having a multimedia encoder is shown. In one embodiment, an edit decoder 802 receives a user input signal from the encoded multimedia terminal and converts it to an edit. Examples of possible edits might be "move the cursor up", "select highlighted item", or "return to previous screen". In another embodiment, the edit decoder 802 may receive a user input signal and convert it into hardware peripheral signals that a standard microprocessor interface would expect. Examples of such hardware peripheral signals might be keystroke signals from a keyboard or serial mouse signals.

A source upgrade processor 804 responds to the output of the edit decoder 802 by modifying a video display. The video display comprises a sequence of video frames, and each frame is typically formed from one or more source images. A first source image 814 (e.g. a background desktop) and a second source image 816 (e.g. a mouse cursor) may be combined to form a video frame by overlaying the second source image at a specified location on the first source image. A video mixer 806 performs the overlay in response to signals from the source upgrade processor 804. The source upgrade processor can modify the source images and specify how they are to be combined (e.g. specify the cursor position). The video mixer 806 may be configured to compare the combined frame with a previous frame stored in a frame store 812 and generate a delta frame if the differences between the frames are small. The video mixer 806 then sends either the combined frame or the delta frame via a video buffer 808 to a multimedia encoder 302. The multimedia encoder 302 receives a sequence of combined and delta frames representing a video display, and compresses the sequence into an encoded multimedia bitstream for transmission to the encoded multimedia terminal.

The multimedia encoder 302 was described in FIG. 4. The RISC CPU 410 implements MPEG video encoding, and for real time applications such as the encoded multimedia network, provides additional features. The RISC CPU 410 can perform error correction encoding to enhance immunity to noise. The enhancing of noise immunity can be implemented in a variety of ways. Anchor frames play a role in the decoding of multiple video frames, and hence need to be "more" protected than bidirectional frames, where an error will affect only a single video frame. A preferred method of protection might therefore be to provide a robust error correction coding (using a large hamming distance code) for anchor frames and a less robust encoding (or no error correction coding) for other non-anchor video frames.

Another additional feature may be using text regions to represent displayed text which is being edited. The encoder 302 may transmit a current text region using the SPU, and the decoder 328 can repeatedly overlay the received text region on the received video frame until a subsequent text region is received. As keystrokes are entered, subsequent text regions are generated to represent the user edits to the text region. The subsequent text regions may then be sent whole or in the form of "text deltas" to the previous text region. This reduces bandwidth and computation requirements by avoiding the need to compress an entire video frame for every user keystroke.

Numerous variations and modifications will become apparent to those skilled in the art once the above disclosure is fully appreciated. It is intended that the following claims be interpreted to embrace all such variations and modifications.

What is claimed is:

1. An improved multimedia encoder for compressing digital video displays, wherein the encoder comprises: a video buffer configured to receive image data; a microprocessor coupled to the video buffer to retrieve image data and configured to store a previous video frame in a frame store, wherein the microprocessor is further configured to generate a compressed multimedia bitstream which includes a compressed video bitstream representative of the received image data; and a bitstream buffer coupled to the microprocessor to receive the compressed multimedia bitstream; wherein the previous video frame is one of a sequence of video frames which includes a subsequent video frame, and wherein a compressed representation of the subsequent video frame is provided to the bitstream buffer as part of the multimedia bitstream only if the subsequent video frame is different from the previous video frame, wherein the compressed video bitstream includes a compressed representation of the subsequent video frame which is compressed using the previous video frame as a reference, wherein the microprocessor is configured to search a dynamically-sized area of the previous video frame for a previous image block which most closely matches a subsequent image block, and wherein the microprocessor increases the search area size during periods of low processor usage and decreases the search area size during periods of high processor usage.

2. The improved multimedia encoder of claim 1, wherein the microprocessor is further configured to receive text data and configured to store a previous text field in a text field store, wherein when the text data represents a change to the previous text field, the microprocessor is configured to provide a compressed representation of a subsequent text field to the bitstream buffer as part of the multimedia bitstream.

3. The improved multimedia encoder of claim 2, wherein the text data represents user edits to the previous text field.

4. The improved multimedia encoder of claim 1, wherein the image data is said sequence of video frames.

5. The improved multimedia encoder of claim 1, wherein the image data is a sequence of deltas representing subsequent video frames by changes to previous video frames.

6. The improved multimedia encoder of claim 1, wherein the compressed video bitstream is coded by the microprocessor to provide redundancy to enhance noise immunity.

7. An improved multimedia encoder with regulated computational loading, wherein the encoder comprises:

a video buffer configured to receive image data;

a microprocessor coupled to the video buffer to retrieve image data and configured to store a previous video frame in a frame store, wherein the microprocessor is further configured to generate a compressed multimedia bitstream which includes a compressed video bitstream representative of the received image data; and a bitstream buffer coupled to the microprocessor to receive the compressed multimedia bitstream;

wherein the previous video frame is one of a sequence of video frames which includes a subsequent video frame, wherein microprocessor compresses the subsequent video frame using the previous video frame as a reference, wherein the microprocessor is configured to search a dynamically-sized area of the previous video frame for a previous image block which most closely matches a subsequent image block, and wherein the microprocessor increases the search area size during periods of low processor usage and decreases the search area size during periods of high processor usage.

8. An improved multimedia encoder with a dynamic search area, wherein the encoder comprises:

a video buffer configured to receive image data;

a microprocessor coupled to the video buffer to retrieve image data and configured to store a previous video frame in a frame store, wherein the microprocessor is further configured to generate a compressed multimedia bitstream which includes a compressed video bitstream representative of the received image data; and a bitstream buffer coupled to the microprocessor to receive the compressed multimedia bitstream;

wherein the previous video frame is one of a sequence of video frames which includes a subsequent video frame, wherein microprocessor compresses the subsequent video frame using the previous video frame as a reference, wherein the microprocessor is configured to search the previous video frame for a first previous image block which matches a subsequent image block to within an adjustable threshold, and wherein the microprocessor is configured to terminate the search upon finding said first previous image block.

* * * * *